US006724596B2

United States Patent
Wade (10) Patent No.: US 6,724,596 B2
(45) Date of Patent: Apr. 20, 2004

(54) HYSTERETIC CURRENT CONTROL METHOD AND AN UNINTERRUPTIBLE POWER SUPPLY USING SAME

(75) Inventor: Joseph R. Wade, Mindoro, WI (US)

(73) Assignee: Powerware Corporation, Raleigh, NC (US)

( * ) Notice: Subject to any disclaimer, the term of this patent is extended or adjusted under 35 U.S.C. 154(b) by 606 days.

(21) Appl. No.: 09/770,480

(22) Filed: Jan. 26, 2001

(65) Prior Publication Data

US 2002/0101751 A1 Aug. 1, 2002

(51) Int. Cl.$^7$ ................................................ H02H 3/00
(52) U.S. Cl. ........................ 361/93.1; 361/18; 361/100; 361/115
(58) Field of Search ..................... 361/18, 93.1, 58, 361/100, 115, 78, 90, 89

(56) References Cited

U.S. PATENT DOCUMENTS

| | | | |
|---|---|---|---|
| 5,041,959 A | * | 8/1991 | Walker .......................... 363/79 |
| 6,348,780 B1 | * | 2/2002 | Grant ........................... 323/222 |
| 6,621,256 B2 | * | 9/2003 | Muratov et al. ............. 323/282 |

* cited by examiner

Primary Examiner—Stephen W. Jackson
(74) Attorney, Agent, or Firm—Leydig, Voit & Mayer, Ltd (57) ABSTRACT

Presented is a control system and method for minimizing the adverse affects resulting from conventional hysteretic current control of power inverters, and an uninterruptible power supply using same. The system of the present invention uses control circuitry for monitoring and classifying the PWM switching events commanded by conventional hysteretic current control and adjusting the dead time delay injected based on these PWM events. Preferably, the control circuitry uses a minimum delay dead time component to preclude the possibility of a shoot through condition from occurring, and also includes a frequency control component of the total dead time delay. In one embodiment this frequency control component may vary in proportion to the switching frequency commanded by the hysteretic current control loop. In an alternate embodiment, the PWM switching events are classified into differing modes of operation, during which a particular fixed frequency control dead time delay is selected. The control of the present invention may also use a maximum difference current control limit for the dead time delay to preclude excessive output current swings beyond the typical hysteretic current control limits.

25 Claims, 3 Drawing Sheets

HYSTERETIC CURRENT CONTROL METHOD AND AN UNINTERRUPTIBLE POWER SUPPLY USING SAME

TECHNICAL FIELD OF THE INVENTION

The present invention relates generally to hysteretic current control of inverter circuits, and more particularly to a hysteretic current control method for an inverter using variable dead time between actuation of complimentary inverter switches.

BACKGROUND OF THE INVENTION

Increasingly, businesses, hospitals, utilities, and even consumers are relying on electronic and computerized equipment to conduct their daily activities. Indeed, as we progress through the new economy and the information age, the amount of reliance and the required sophistication of the electronic equipment used will only increase. Unfortunately, such increased use and sophistication of the electronic equipment brings an increased demand for reliable, quality electric power without which operations may be disrupted and critical data may be lost.

Despite the advances in the sophistication and availability of electronic and computerized equipment, the availability and reliability of high quality electric power in the quantities demanded by the growing economy has not kept pace. Indeed, while many utilities believe that rolling brown-outs provide an adequate solution to their inability to supply the electric power required by their customers, the impact that such brown-outs has on a business' productivity and profitability is, quite simply, unacceptable.

In addition to the utilities' inability to reliably supply the amount of electric power required, the quality of the power that is supplied often is so poor so as to affect the operation of the modem sophisticated electronic and computer equipment. Voltage sags and spikes are relatively common on the utility power lines, particularly during periods of factory shift changes in industrialized areas. Other power quality problems may be introduced by natural causes such as lightning induced voltage spikes, voltage droops caused by accidental contact with power distribution equipment by animals, tree limbs, etc. Oftentimes, these power quality perturbations have a more detrimental effect on the electronic and computerized equipment than complete power losses because the operating characteristics of the components of such equipment varies. That is, some portions of the electronic equipment may cease operating before other portions shut down, possibly resulting in erroneous operation, corrupted data, etc.

To overcome these problems, uninterruptible power supplies, line conditioners, and sophisticated power supplies have been developed. These devices and systems typically use electronic switching components to construct a regulated, high quality output voltage despite the perturbations of the input AC power from the utility. Indeed, the uninterruptible power supplies have the ability to continue to supply a high quality output voltage to the electronic and computerized equipment even during a complete loss of input AC electric power from the utility. Various well understood circuit arrangements and topologies provide this functionality.

Figure 1:
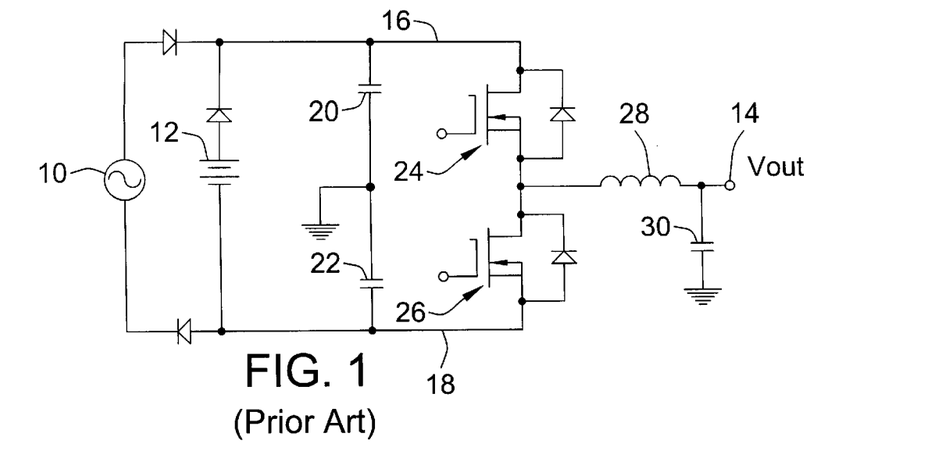
FIG. 1 is a simplified single line schematic diagram of a conventional uninterruptible power supply suitable for use with the control methodology of the present invention.

One such well-known topology, known as a double conversion half-bridge inverter, is illustrated in simplified single line schematic form in FIG. 1. The power inputs to this inverter topology typically include the AC utility voltage 10 and, in the case of an uninterruptible power supply, a battery or other electric power storage device 12. Of course, one skilled in the art will recognize that either of these sources 10, 12 may be removed as an input without an effect on the inverter's ability to generate an output AC voltage at its output terminals 14. In operation, a positive and a negative voltage are developed on the positive rail 16 and the negative rail 18 of the inverter respectively. The positive 20 and negative 22 bus capacitors provide the energy storage for development of the output voltage waveform during operation of the inverter. This output voltage waveform is constructed by alternately opening and closing the electronic switching elements 24, 26 as is well known in the art. Output filtering of the voltage waveform so constructed is accomplished through the output inductor 28 and filter capacitor 30.

Figure 2:
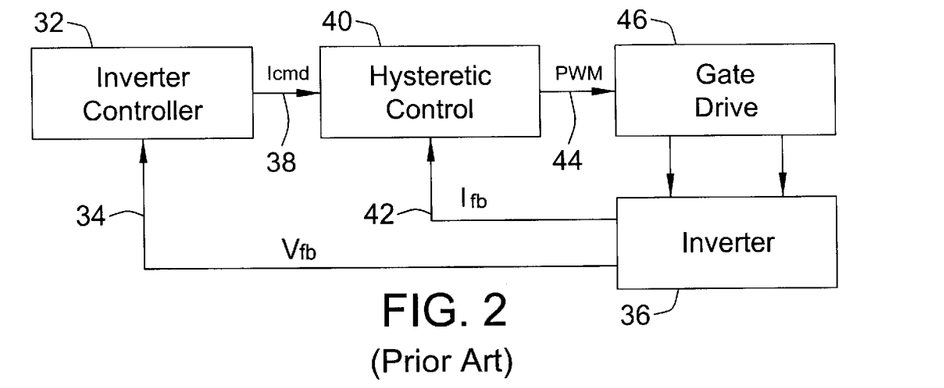
FIG. 2 is a simplified functional control block diagram of a conventional inverter controller using hysteretic current control.
Figure 3:
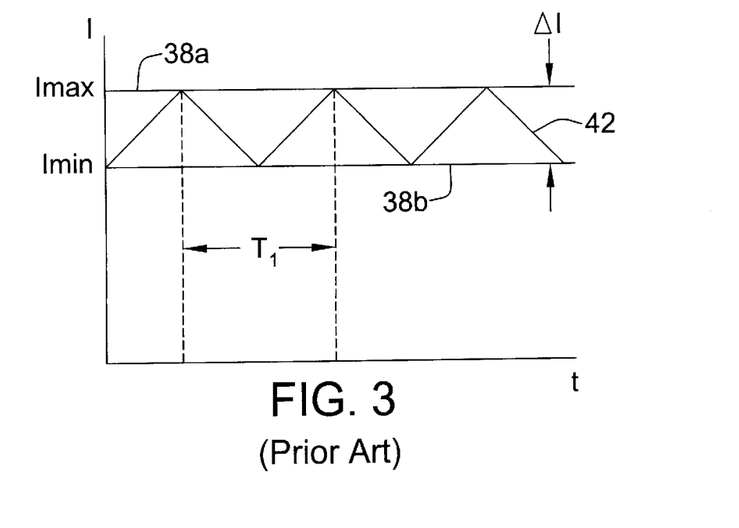
FIG. 3 is a graphical illustration of the hysteretic current control used in the conventional controller of FIG. 2.

While there are many control and command methodologies that may be used with an inverter to construct an AC output voltage waveform, most methodologies use both voltage and current control loops to ensure stable, reliable performance for the equipment coupled thereto. As with the overall methodology, various methods are well known in the art for providing both the voltage and current control and regulation. One such current control method made popular by its ease of implementation and inherent stability is a variable frequency current control topology known as hysteretic control. In simplified functional block diagrammatic form, a controller using hysteretic current control is illustrated in FIG. 2. As may be seen from this simplified block diagram, the basic inverter controller 32 receives the voltage feedback signal 34 from the inverter 36 and generates an output current command 38 to the hysteretic control block 40. The hysteretic control block also receives a current feedback signal 42 from the inverter 36. Within the hysteretic control 40, the current command signal 38 creates a current control band having a maximum current limit $38_a$ and a minimum current control limit $38_b$ as illustrated in FIG. 3. The actual current 42 supplied by the inverter 36 is monitored against these control limits $38_a$, $38_b$. The hysteretic control 40 then generates an output PWM signal 44 to the gate drive circuitry 46 to control the switching elements 24, 26 (see FIG. 1) of the inverter 36.

As will be recognized by those skilled in the art, the hysteretic current control provides a method of controlling the output current of the inverter where the instantaneous output current is allowed to vary within the current control band $\Delta I$ defined by the maximum current limit $38_a$, and the minimum current limit $38_b$. This hysteretic control 40 operates to turn on the upper switching element 24 (see FIG. 1) when the current 42 is below the maximum current limit $38_a$. As the current 42 rises to this maximum limit $38_a$, the hysteretic control 40 operates to turn off the switching element 24 and to turn on the switching element 26. This causes the instantaneous current 42 to fall. Once the current 42 reaches the minimum current limit $38_b$, the hysteretic control 40 operates to turn off the lower switching element 26 and to turn on the upper switching element 24 to again cause the instantaneous current 42 to rise. This alternative switching of the switching elements 24, 26 continues to maintain the instantaneous current 42 within the upper and lower current control limits $38_a$, $38_b$ in a known manner.

The time $T_1$ between these events defines the switching frequency of the hysteretic control. This time $T_1$ will typically vary as the output voltage rises and falls over the AC cycle. Near the peak of the AC output voltage cycle, the actual inverter current 42 will rise rapidly and fall very slowly, and therefore the frequency of switching will be greatly decreased. Near the zero cross of the AC outlet voltage waveform, the current will rise and fall relatively rapidly, therefore increasing the switching frequency commanded by the hysteretic control. A typical variation in the output switching frequency resulting from the hysteretic control 40 may be in the range of 10:1 in frequency when going from the zero cross to peak AC. Unfortunately, at the higher switching rates, the pure hysteretic control results in excessive heating of the inverter switches due to the inherent switching losses that occur each time the switching devices are transitioned. At the lower switching rates, excessive harmonic distortion may occur if the rate drops too low.

There exists, therefore, a need in the art to provide a control mechanism that allows the use of hysteretic current control, but that better controls the switching frequency variation over the AC voltage waveform to prevent excessive heating of the inverter switching elements.

SUMMARY OF THE INVENTION

In view of the above, it is an object of the present invention to provide a new and improved inverter control methodology. More particularly, it is an object of the present invention to provide a new and improved inverter control that uses hysteretic current control, but which allows for control of the switching frequency to reduce undesirable effects which may result from typical hysteretic control. It is a further object of the present invention to provide a new and improved uninterruptible power supply that uses such control.

In one embodiment, a current control method for use with an inverter having at least two switching elements that are controllable to construct an AC output waveform in accordance with a pulse-width modulated (PWM) control signal from a hysteretic control circuit is presented. This method comprises the steps of monitoring the duration of each PWM event, classifying these events into at least two classifications, comparing each of the PWM event's classifications to the previous event classification, and selecting a dead time delay based on this comparison. The method commands off one of the switching elements and delays for the selected dead time delay the commanding on of the other of the switching elements.

Preferably, the step of classifying comprises the step of classifying each of the PWM events as one of long duration and short duration. Further, the step of selecting a dead time delay preferably comprises the steps of selecting a minimum dead time delay, and adding a frequency control dead time delay component when the step of comparing identifies two consecutive short events. In an embodiment wherein the first switching element couples a positive rail to an output of the inverter and the second switching element couples a negative rail to the output of the inverter, the step of commanding off one of the switching elements preferably comprises the step of commanding off the first switching element. Further, the step of delaying for the selected dead time delay the commanding on of another of the switching elements comprises delaying the commanding on of the second switching element.

In a further embodiment, the step of commanding off one of the switching elements comprises commanding off the second switching element, and the step of delaying a commanding on of another of the switching elements comprises delaying the commanding on of the first switching element. Preferably, transitions from the first switching element to the second switching element are delayed for the minimum dead time delay, and transitions from the second switching element to the first switching element are delayed for the selected dead time delay.

In a further embodiment, the step of selecting a dead time delay comprises the steps of selecting a first dead time when two consecutive events of a first classification are detected, selecting a second dead time when two consecutive events of a second classification are detected, and maintaining a previous selected dead time when two consecutive events are of different classifications. An embodiment of the method further comprises the step of selecting a third dead time during an overcurrent condition.

In an alternate embodiment, a method of controlling a switching frequency of inverter switches for use with an inverter having at least a first and a second switching element controllable to construct an AC output waveform in accordance with a pulse-width modulated (PWM) control signal from a hysteretic control circuit is presented. This method comprises the steps of monitoring a duration of each PMW event, injecting a first dead time delay between transitions of the switching elements when the duration is greater than a preset time, and injecting a second dead time delay between transitions of the switching elements when the duration is less than the preset time. Preferably, the method further comprises the steps of comparing the duration of a current PWM event to the duration of an immediately preceding PWM event, maintaining the injection of the first dead time delay once selected until the duration of two consecutive PWM events is less than the preset time, and maintaining the injection of the second dead time delay once selected until the duration of two consecutive PWM events is greater than the preset time.

In a further embodiment, the step of injecting the first dead time delay comprises the step of injecting a minimum dead time delay of duration minimally sufficient to prevent a current shoot through condition. Further, the step of injecting the second dead time delay comprises the step of injecting the minimum dead time delay plus a frequency control component of duration to cumulatively reduce excessive heating of the switching elements. Alternatively, the method further comprises the steps of detecting an overcurrent condition and injecting a third dead time delay between transitions of the switching elements in response.

Also presented is a controller for use with an inverter having at least a first and a second switching element controllable to construct an output AC waveform for use by equipment. The controller preferably comprises an inverter control circuit using hysteretic current control. The control circuit generates a pulse-width modulated (PWM) inverter control signal to control transitions of the switching elements to construct the output AC waveform in response to a voltage and a current feedback from the inverter output. The PWM inverter control signal has PWM events defined by transitions of the signal. The controller further comprises a logic driver circuit coupled to receive the PWM inverter control signal. This logic circuit preferably generates a first and a second drive signal to transition the first and second switching elements in response to the PWM inverter control signal. The logic driver circuit monitors the duration of the PWM events and delays the generation of the first and the second drive signals for one of at least a first and a second dead time based on the duration of the PWM events.

The logic driver circuit generates a first dead time of duration minimally sufficient to prevent a shoot through condition from occurring, and a second dead time comprising the first dead time plus an additional frequency control delay of duration to cumulatively reduce a switching frequency governed by the PWM inverter control signal. The hysteretic current control generates the PWM inverter control signal to maintain the current feedback within a maximum and a minimum current limit. However, the logic driver circuit uses the second dead time to delay generation of the first and the second drive signals in a manner to allow the current feedback to fall below the minimum current limit to reduce a switching frequency of the switching elements. Alternatively, the hysteretic current control generates the PWM inverter control signal to maintain the current feedback within a current control band, and the logic driver circuit uses the second dead time to delay generation of the first and the second drive signals in a manner to allow the current feedback to exceed the current control band to reduce a switching frequency of the switching elements.

In a further embodiment, the logic driver circuit classifies the duration of the PWM events into at least a first and a second class, and delays the generation of the first and the second drive signals for the first dead time when the PWM events are of the first class, and for the second dead time when the PWM events are of the second class. Preferably, the logic driver circuit maintains a current selected dead time until at least two consecutive PWM events are classified as other than that required for the current selected dead time.

Also presented is an uninterruptible power supply (UPS) comprising an inverter having a first input adapted to receive line AC power, a second input adapted to receive stored DC power, and an inverter output. The inverter has at least a first and a second switching element controllable to supply an AC voltage and current output from the line AC power and the stored DC power. The UPS also comprises a controller having a voltage and a current feedback input coupled to the inverter output, and a first and a second drive signal output operatively coupled to the first and the second switching elements to control construction of the AC voltage and current output. The controller uses hysteretic current control to generated a pulse-width modulated (PWM) control signal, and includes a logic driver circuit operative to generated the first and the second drive signals in response to the PWM control signal. Preferably, the logic driver circuit monitors the duration of each pulse-width of the PWM control signal and inserts a dead time delay between transitions of the first and the second drive signal. This dead time delay has a duration based on the duration of each pulse-width of the PWM control signal.

In a further embodiment, the logic driver circuit generates a first dead time of duration minimally sufficient to prevent a shoot through condition from occurring, and a second dead time comprising the first dead time plus an additional frequency control delay of duration to cumulatively reduce a switching frequency governed by the PWM control signal. The logic driver circuit uses the first dead time when the duration of a pulse-width is greater than a predetermined threshold, and uses the second dead time when the duration of a pulse-width is less than the predetermined threshold. Preferably, the logic driver circuit maintains a currently selected dead time delay until at least two consecutive pulse-widths have a duration that dictate a different dead time delay. Additionally, in one embodiment the logic driver inserts a third dead time delay when the controller detects an overcurrent condition.

Other objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION OF THE INVENTION

Figure 4:
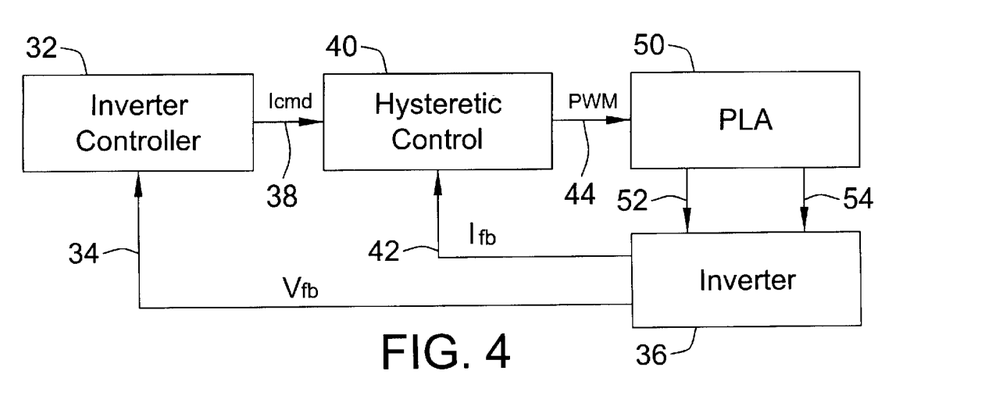
FIG. 4 is a functional control block diagram in accordance with the teachings of the instant invention.

An embodiment of a control system constructed in accordance with the teachings of the present invention is illustrated in functional block diagrammatic form in FIG. 4. As may be seen from FIG. 4, a conventional inverter controller 32 receives a voltage feedback signal 34 from an inverter 36, which may form a portion of an uninterruptible power supply as is known in the art and illustrated in FIG. 1. The inverter controller 32 generates an output current command 38 to adjust the output of the inverter 36 based on conventional control methodologies. This output current command 38 is used by the hysteretic control 40 to generate the actual PWM control signal 44. This control signal 44 will eventually drive the inverter switches 24, 26 (see FIG. 1) to their proper positions to construct the output AC voltage and current waveforms to supply the equipment (not shown) coupled thereto. The hysteretic control 40 also receives a current feedback signal 42 that is used to control the PWM output signal 44 in conventional hysteretic control fashion.

To this point, the inverter controller 32 and hysteretic control 40 have used conventional control methodologies and techniques to generate the output PWM control signal 44. However, instead of using a simple gate drive circuit to control the position of the switching devices in the inverter 36, the system of the present invention uses a programmable logic array (PLA) 50 or other logical device to control the output control signals 52, 54. These output control signals 52, 54 drive the inverter switches of inverter 36 as will be described below. Specifically, the PLA 50 controls the frequency at which the inverter switches are transitioned. This is done to reduce the switching losses that occur at high switching rates dictated by the PWM control signal 44 as a result of the hysteretic control 40 at various points on the AC voltage waveform.

The control logic within the PLA 50 injects a predetermined "dead time" ($T_d$) at PWM transitions causing both control signals 52, 54 to be off. This results in both switching elements being off. Conventionally, the use of control signal dead time has been viewed as a necessary evil to prevent a shoot-through condition within the inverter caused by both switching elements (24, 26 of FIG. 1) being closed at the same time. The need for the dead time is a result of the switching characteristics of the physical switching devices themselves. Specifically, typical electronic switching devices do not turn off at the exact time that the gate drive control signal is shut off. Actual device turn off times may lag the gate drive control signal by as much as one to many microseconds. Further, the physical switching devices also do not turn on at the exact time that the gate drive control signal commands such, although such turn on lags are much less than the turn off lags just discussed. Therefore, to prevent a direct short circuit between the positive 16 and the negative 18 busses of the inverter 36 (see FIG. 1) a short delay or dead time must be injected between the turning off of one switch and the turning on of the other. Conventionally, the dead time delay injected by the gate drive circuitry 46 (see FIG. 2) is a fixed amount injected at each transition of the PWM control signal 44, and is selected to be slightly longer than the maximum turn off delay specified for the inverter switches used.

Figure 5:
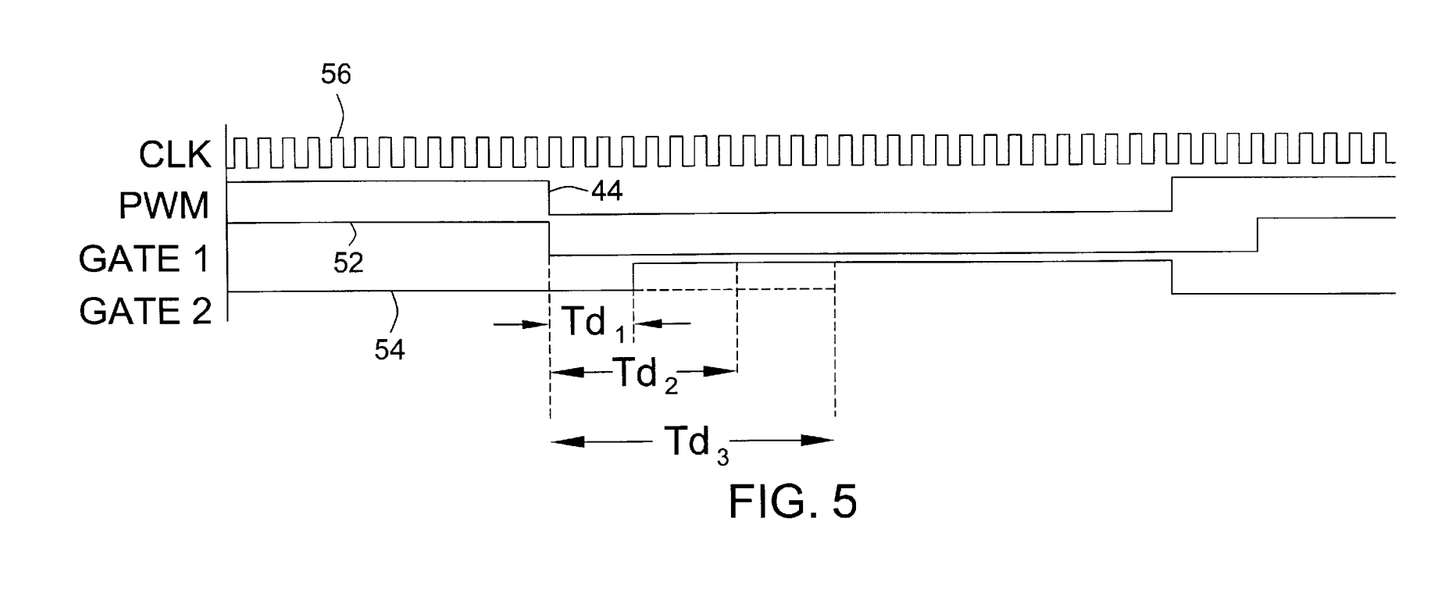
FIG. 5 is a control signal timing diagram illustrating aspects of the control system of the present invention.

Unlike the conventional gate drive circuitry 46, which injects a fixed dead time merely to prevent a shoot through condition, the control system of the present invention, and in particular the control logic within the PLA 50, monitors the PWM control signal 44 and adjusts the duration of the dead time delay to control the switching frequency of the inverter switches. The waveform diagram of FIG. 5 illustrates this control methodology. Specifically, the PLA 50 monitors the PWM control signal 44 to determine a duration of each switching event. This is done by using a clock signal 56 along with a conventional counter to determine the PWM switching event length. The PLA 50 then generates the switching control signals 52, 54 to transition the inverter control switches to generate the output waveform. At each transition of the PWM control signal 44 the PLA 50 commands off the currently energized inverter switch. However, before the other switch is commanded on, the PLA 50 injects a variable dead time delay before turning on the other control signal.

This dead time delay includes a minimum delay component selected to ensure that a shoot through condition cannot occur, and a frequency control component, as will be discussed more fully below. The minimum delay component, illustrated in FIG. 5 as delay $Td_1$, is set in a conventional manner based upon the turn off time of the particular switching devices used in the construction of the inverter 36. The actual time selected for the delay $Td_1$ is preferably minimally sufficient to ensure that a shoot through condition cannot occur, including device turn-on and turn-off delays, signal processing time, driver delays, etc. This time may include additional safety margin timing, but should be as small as possible to minimize the harmonic distortion resulting from such dead time insertion.

In one embodiment with a calculated device-driven dead time of 1 $\mu$sec and a controller cycle time of one microsecond, the dead time $Td_1$ is set to two microseconds. In this way, regardless of the controller processing and timing of the actual output signals from the driver circuitry, a shoot through condition cannot occur. The maximum dead time could be as long as three microseconds. In this embodiment of an uninterruptible power supply constructed in accordance with the teachings of the present invention insulated gate bipolar transistors (IGBTs) are used. The frequency control component of the dead time delay injected by the PLA 50 may vary from 0 to some maximum value above which the amount of harmonic distortion generated by the increased dead time would exceed the power quality specifications for the system in which the inverter 36 is to be used. In one embodiment, the maximum frequency control component may add an additional 17 microseconds, for a total dead time delay of 19 microseconds. Other topologies may use different timing, guided by the preclusion of shoot through at one end and the minimization of harmonic distortion to a level acceptable for the given application at the other.

Finally, the PLA 50 also includes a provision for inverter overcurrent protection which will inject a dead time delay in the switching control signals 52, 54 to reduce the likelihood of damage to the inverter switches in an overcurrent condition. Such an overcurrent condition typically results from a short circuit on the output terminals 14 (see FIG. 1). Several known methods may be used to detect this condition, including current threshold detection, indication from the switching elements themselves, detection of an exceptionally high PWM switching rate, etc. In one embodiment, this overcurrent protection dead time is set at a constant value, preferably approximately 28 microseconds. As a result of this constant overcurrent protection dead time, the PLA 50 reduces switching losses and allows the inverter 36 to sustain a higher level of current during a short circuit output condition than would otherwise be possible. Therefore, a double benefit is realized through the PLA 50 of the present invention.

Through the use of the additional frequency control component of the dead time delay injected by the PLA 50, the PLA 50 is able to dynamically control the switching frequency commanded by the hysteretic control loop. This allows the PLA 50 to receive the benefits of the hysteretic control without suffering from the ill effects resulting from the wide switching frequency range over the inverter output waveform. As illustrated in FIG. 5, different dead time delays ($Td_1$, $Td_2$, and $Td_3$) may be injected in the control signals 52, 54 to increase the amount of time that both switches 24, 26 (see FIG. 1) are off.

Figure 6:
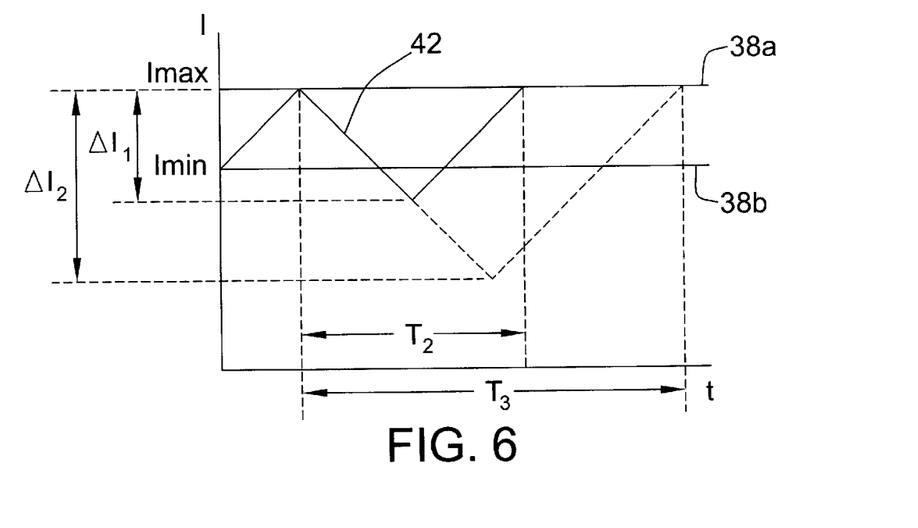
FIG. 6 is a graphical illustration of the modified hysteretic current control of the present invention.

FIG. 6 illustrates in graphical form the effect of this controlled dead time delay injected by PLA 50 in terms of the typical hysteretic control. As the inverter current 42 increases to the maximum hysteretic current control limit $38_a$, the positive inverter switch 24 (see FIG. 1) is turned off and the negative inverter switch 26 is turned on, after the appropriate minimum delay dead time to preclude a shoot through condition. As such, the current 42 from the inverter 36 decays. As this current 42 reaches the hysteretic control minimum current limit $38_b$, the PWM control signal 44 will be transitioned in an attempt to regulate the current 42 to within these two control current limits $38_a$, $38_b$. At this point, the transition in the PWM control signal 44 will result in the PLA 50 commanding off the negative inverter switch 26 (see FIG. 1) immediately. However, instead of merely waiting for the minimum delay dead time simply to preclude current shoot through, the PLA 50 may inject an additional frequency control component to the dead time as discussed above to delay the turning on of the positive inverter control switch 24 (see FIG. 1). As a result, the current 42 will continue to decay below the minimum current limit $38_b$ set by the hysteretic control 40. After the expiration of this controlled dead time delay, the positive inverter switch 24 is closed and the current again begins to rise until it reaches the maximum current limit $38_a$ set by the hysteretic control 40.

As a result of this additional frequency control dead time being injected in the control signals 52, 54, the actual switching frequency of the inverter has been reduced as illustrated by the time period $T_2$ in FIG. 6. The length of this additional frequency control dead time delay may be governed by the desired maximum switching frequency of the inverter, or by a maximum difference current (measured as $\Delta I_2$) beyond which the output waveform distortion becomes unacceptable. Indeed, one embodiment of the present invention uses both parameters to ensure the power quality output at all operating conditions. That is, if the PLA 50 were to initially select a frequency control component of the dead time delay such that it would result in the difference current exceeding a desired maximum, the PLA 50 would override the injected dead time delay by turning on the proper switch at a point beyond which the current would exceed this maximum set value. Additionally, while FIG. 6 illustrates only a delay in the transition from the negative inverter switch 26 to the positive inverter switch 24, one skilled in the art will recognize that the dead time delay injected by PLA 50 may occur at the transition from the positive switch 24 to the negative switch 26 if system design constraints will allow for the inverter output current 42 to exceed the maximum hysteretic current control limit $38_a$. If not, the dead time between such transitions will be maintained at the minimum delay required to prevent current shoot through only.

Figure 7:
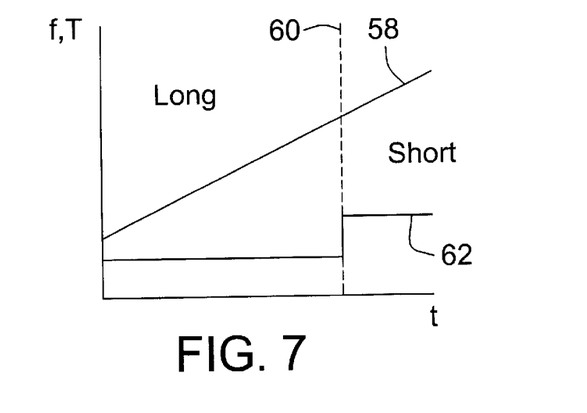
FIG. 7 is a graphical illustration of a PWM event classification mechanism in accordance with the teachings of the present invention.

The PLA 50 may inject increasing frequency control dead time delays in proportion to the increase in switching frequency commanded by the hysteretic control 40. However, during much of the inverter operation the switching rates commanded by the hysteretic control 40 do not pose any significant problem in terms of excessive heating caused by switching losses that are commonly associated with high switching frequencies. Therefore, the PLA 50 may employ characterization logic to characterize the PWM switching events into long and short events to determine the frequency control component of the dead time delay to be injected. Specifically, and with reference to FIG. 7, as the switching frequency 58 increases, a point 60 will be reached above which the switching losses will begin to generate excessive heating of the inverter switches.

Prior to this point 60, the time between the PWM control signal 44 transitions as monitored by the PLA 50 are characterized as "long" switching events. After this point 60, the PWM switching events as monitored by the PLA 50 may be characterized as "short" switching events. As may be seen from the graphical illustration of FIG. 7, once the hysteretic control 40 attempts to operate the inverter 36 in the "short" PWM event mode, the PLA 50 increases the total dead time delay period 62 from a preferred minimum, to a preferred maximum for frequency control. As indicated above, in one embodiment the dead time delay period during the long PWM event switching mode is two microseconds, while the dead time delay period during operation in the short PWM event mode is 19 microseconds.

To obtain this operation, the logic within the PLA 50 operates in accordance with the following description. Upon initiation, the PLA 50 counts the PWM event by monitoring both the PWM command and the clock signal. Once the PLA 50 has counted the PWM event, it then classifies this PWM event. While a preferred embodiment uses only two stages of long and short, alternate embodiments use additional classifications to stage the dead time delay injection in multiple steps as desired.

The system of the present invention recognizes that certain system level perturbations, such as load switching transients, intermittent faults, etc., could result in a spurious PWM event being generated. That is, during normal operation during the long PWM event mode, a sudden spike or droop in the output current of the inverter could result in the hysteretic control 40 transitioning the PWM control signal 44 in such a manner so as to generate one PWM event of short duration. To preclude these types of spurious events from transitioning the frequency control component of the total dead time delay, the PLA 50 next compares the PWM event to the prior PWM event before selecting the appropriate dead time. Preferably, the transitioning of the frequency control component of the dead time delay does not take place unless there have been at least two consecutive PWM events in a particular mode. This adds additional stability to the control of the PLA 50. Once the appropriate dead time has been selected, the PLA 50 then delays the gate turn on for the selected dead time before ending.

Through this variable dead time control, both the harmonic distortion generated at low switching frequencies and the excessive heating generated at high switching frequencies of the typical hysteretic control may be minimized. Specifically, by selecting an appropriately small minimum delay dead time component for use during relatively low frequency switching of the inverter, no additional harmonic distortion resulting from a longer dead time will result. Further, by allowing the PLA 50 to inject a frequency control component into the dead time delay, the excessive heating typically associated with high switching frequencies commanded by the hysteretic control may also be reduced. Therefore, the system and method of the present invention is able to reap the benefits of the hysteretic control while minimizing the adverse effects at either end of the switching frequency spectrum typically commanded by conventional hysteretic control current loops.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A current control method for use with an inverter having at least a first and a second switching element controllable to construct an AC output waveform in accordance with a pulse-width modulated (PWM) control signal from a hysteretic control circuit, comprising the steps of:

monitoring a duration of each PWM event;

classifying each of the PWM events into one of at least two classifications;

comparing each of the PWM's classification to a previous event classification;

selecting a dead time delay based on said step of comparing;

commanding off one of the switching elements; and delaying for the selected dead time delay a commanding on of another of the switching elements after the commanding off of the one of the switching elements.

2. The method of claim 1, wherein the step of classifying comprises the step of classifying each of the PWM events as one of long duration and short duration.

3. The method of claim 2, wherein the step of selecting a dead time delay comprises the steps of:

selecting a minimum dead time delay; and adding a frequency control dead time delay component when the step of comparing identifies two consecutive short events.

4. The method of claim 3 wherein the first switching element couples a positive rail to an output of the inverter and wherein the second switching element couples a negative rail to the output of the inverter, and wherein the step of commanding off one of the switching elements comprises the step of commanding off the first switching element, and wherein the step of delaying for the selected dead time delay a commanding on of another of the switching elements comprises the step of delaying for the selected dead time delay the commanding on of the second switching element.

5. The method of claim 4, wherein the step of commanding off one of the switching elements comprises the step of commanding off the second switching element, and wherein the step of delaying for the selected dead time delay a commanding on of another of the switching elements comprises the step of delaying for the minimum dead time delay the commanding on of the first switching element.

6. The method of claim 4, wherein transitions from the first switching element to the second switching element are delayed for the minimum dead time delay, and wherein transitions from the second switching element to the first switching element are delayed for the selected dead time delay.

7. The method of claim 1, wherein the step of selecting a dead time delay comprises the steps of:
    selecting a first dead time when two consecutive events of a first classification are detected;
    selecting a second dead time when two consecutive events of a second classification are detected; and
    maintaining a previous selected dead time when two consecutive events are of different classifications.

8. The method of claim 7, further comprising the step of selecting a third dead time during an overcurrent condition.

9. A method of controlling a switching frequency of inverter switches for use with an inverter having at least a first and a second switching element controllable to construct an AC output waveform in accordance with a pulse-width modulated (PWM) control signal from a hysteretic control circuit, comprising the steps of:
    monitoring a duration of each PMW event;
    injecting a first dead time delay between transitions of the switching elements when the duration is greater than a preset time; and
    injecting a second dead time delay between transitions of the switching elements when the duration is less than the preset time.

10. The method of claim 9, further comprising the steps of:
    comparing the duration of a current PWM event to the duration of an immediately preceding PWM event;
    maintaining the injection of the first dead time delay once selected by said step of injecting the first dead time delay until the duration of two consecutive PWM events is less than the preset time; and
    maintaining the injection of the second dead time delay once selected by said step of injecting the second dead time delay until the duration of two consecutive PWM events is greater than the preset time.

11. The method of claim 9, wherein the step of injecting the first dead time delay comprises the step of injecting a minimum dead time delay of duration minimally sufficient to prevent a current shoot through condition.

12. The method of claim 11, wherein the step of injecting the second dead time delay comprises the step of injecting the minimum dead time delay plus a frequency control component of duration to cumulatively reduce excessive heating of the switching elements.

13. The method of claim 9, further comprising the steps of:
    detecting an overcurrent condition; and
    injecting a third dead time delay between transitions of the switching elements in response to said step of detecting.

14. A controller for use with an inverter having at least a first and a second switching element controllable to construct an output AC waveform for use by equipment coupled to an output thereof, comprising:
    an inverter control circuit using hysteretic current control to generate a pulse-width modulated (PWM) inverter control signal to control transitions of the switching elements to construct the output AC waveform in response to a voltage and a current feedback from the inverter output, said PWM inverter control signal having PWM events defined by transitions thereof; and
    a logic driver circuit coupled to receive said PWM inverter control signal, said logic circuit generating a first and a second drive signal to transition the first and second switching elements in response to said PWM inverter control signal; and
    wherein said logic driver circuit monitors a duration of said PWM events and delays a generation of said first and said second drive signals for one of at least a first and a second dead time based on said duration of said PWM events.

15. The controller of claim 14, wherein said logic driver circuit generates a first dead time of duration minimally sufficient to prevent a shoot through condition from occurring, and a second dead time comprising said first dead time plus an additional frequency control delay of duration to cumulatively reduce a switching frequency governed by said PWM inverter control signal.

16. The controller of claim 14, wherein said hysteretic current control generates said PWM inverter control signal to maintain the current feedback within a maximum and a minimum current limit, and wherein said logic driver circuit uses said second dead time to delay generation of said first and said second drive signals in a manner to allow the current feedback to fall below said minimum current limit to reduce a switching frequency of the switching elements.

17. The controller of claim 14, wherein said hysteretic current control generates said PWM inverter control signal to maintain the current feedback within a current control band, and wherein said logic driver circuit uses said second dead time to delay generation of said first and said second drive signals in a manner to allow the current feedback to exceed said current control band to reduce a switching frequency of the switching elements.

18. The controller of claim 14, wherein said logic driver circuit classifies said duration of said PWM events into at least a first and a second class, and wherein the logic driver circuit delays a generation of said first and said second drive signals for said first dead time when said PWM events are of said first class, and for said second dead time when said PWM events are of said second class.

19. The controller of claim 18, wherein said logic driver circuit maintains a current selected dead time until at least two consecutive PWM events are classified as other than that required for said current selected dead time.

20. An uninterruptible power supply, comprising:
    an inverter having a first input adapted to receive line AC power, a second input adapted to receive stored DC power, and an inverter output, the inverter having at least a first and a second switching element controllable to supply an AC voltage and current output on said inverter output from the line AC power and the stored DC power; and a controller having a voltage and a current feedback input coupled to said inverter output, and a first and a second drive signal output operatively coupled to said first and said second switching elements to control construction of said AC voltage and current output, said controller using hysteretic current control to generated a pulse-width modulated (PWM) control signal, said controller further including a logic driver circuit operative to generated said first and said second drive signals in response to said PWM control signal; and wherein said logic driver circuit monitors a duration of each pulse-width of said PWM control signal and inserts a dead time delay between transitions of said first and said second drive signal having a duration based on said duration of each pulse-width of said PWM control signal.

21. The uninterruptible power supply of claim 20, wherein said logic driver circuit generates a first dead time of duration minimally sufficient to prevent a shoot through condition from occurring, and a second dead time comprising said first dead time plus an additional frequency control delay of duration to cumulatively reduce a switching frequency governed by said PWM control signal, and wherein said logic driver circuit uses said first dead time when said duration of a pulse-width is greater than a predetermined threshold, and wherein said logic driver circuit uses said second dead time when said duration of a pulse-width is less than said predetermined threshold.

22. The uninterruptible power supply of claim 21, wherein said logic driver circuit maintains a currently selected dead time delay until at least two consecutive pulse-widths have a duration that dictate a different dead time delay.

23. The uninterruptible power supply of claim 21, wherein said logic driver inserts a third dead time delay when said controller detects an overcurrent condition.

24. A method of controlling a switching frequency of inverter switches for use with an inverter having at least a first and a second switching element controllable to construct an AC output waveform in accordance with a pulse-width modulated (PWM) control signal from a hysteretic control circuit, comprising the steps of monitoring a duration of each PMW event and injecting a dead time delay between transitions of the switching elements based on the duration of the PWM event.

25. A method of controlling a switching frequency of inverter switches for use with an inverter having at least a first and a second switching element controllable to construct an AC output waveform in accordance with a pulse-width modulated (PWM) control signal from a hysteretic control circuit, comprising the steps of monitoring a duration of each PMW event, classifying each PWM event, and injecting a dead time delay between transitions of the switching elements based on the classification of the PWM event.

* * * * *